Dec. 4, 1928.　　　　　E. WILDHABER　　　　1,693,740
GEAR
Filed Aug. 6, 1926　　　4 Sheets-Sheet 1
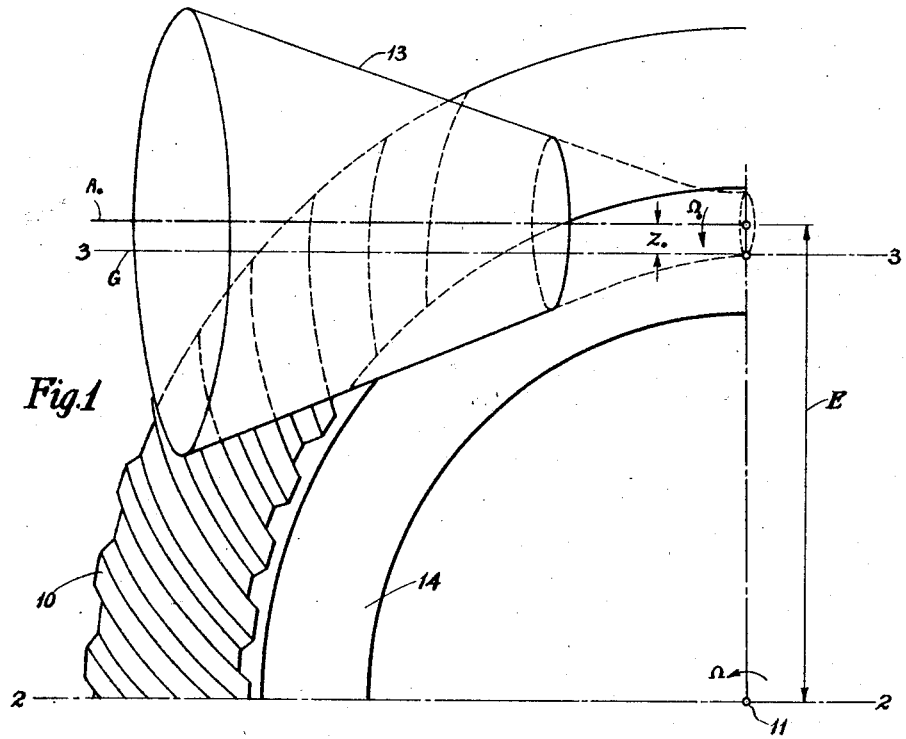
Fig.1
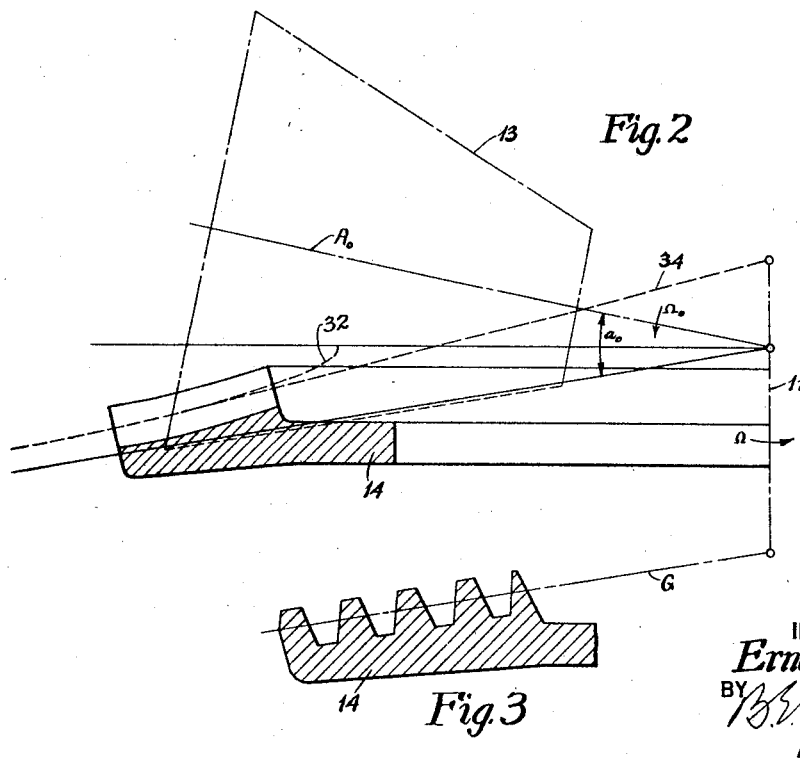
Fig.2
Fig.3
INVENTOR
*Ernest Wildhaber*
BY
ATTORNEY Dec. 4, 1928.  E. WILDHABER  1,693,740

GEAR

Filed Aug. 6, 1926  4 Sheets-Sheet 2

INVENTOR
*Ernest Wildhaber*
BY
ATTORNEY

Dec. 4, 1928.　　　　　　　　　　　　　　　　　　　　　1,693,740
E. WILDHABER
GEAR
Filed Aug. 6, 1926　　　　4 Sheets-Sheet 3

INVENTOR
*Ernest Wildhaber*
BY
ATTORNEY

Patented Dec. 4, 1928.

1,693,740

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

GEAR.

Application filed August 6, 1926. Serial No. 127,618.

The present invention relates to gears and particularly to gears provided with longitudinally curved teeth.

One object of the present invention is to provide a new and efficient system of curved tooth gearing which may be simply, quickly and cheaply produced.

Another object of the invention is the provision of a system of curved tooth gearing in which one member can be cut by a hob without the usual generating roll, with the resultant advantages of increased simplicity and speed of production.

A further object of the invention is to provide a form of longitudinally curved tooth gear which will mesh with line contact with a worm or with a mating bevel gear.

Other objects of the invention will be apparent hereinafter from the specification and from the recital of the appended claims.

This application is a continuation in part of my copending application Serial No. 748,572, filed November 8, 1924.

In the drawings:

Fig. 1 is an elevation of a curved tooth bevel gear produced in accordance with and embodying the present invention, and showing diagrammatically a hobbing cutter arranged in cutting contact therewith;

Fig. 2 is a sectional plan view of a portion of the gear on the line 2—2 of Fig. 1, showing diagrammatically also the relative positions of gear and hob during the production of the gear;

Fig. 3 is a sectional view of a portion of the gear taken on the line 3—3 of Fig. 1;

The present invention is a result of efforts to simplify and expedite and cheapen the commercial production of efficient curved tooth gears. This invention has as its basis the discovery of a form of tapered gear which can be produced in a hobbing or continuous indexing operation without the usual generating roll and which can be meshed selectively with a worm, corresponding to the hob employed to produce the gear, or with a mating gear produced in a generating operation.

The gear which forms the basis of this invention is illustrated, in a preferred embodiment, in Figs. 1, 2 and 3. This gear is provided with longitudinally curved teeth 10 which are preferably of straight profile and which are of rack section and constant pitch, as shown particularly in Fig. 3, along the straight line G which is offset from the axis 11 of the gear. The teeth of the gear are of non-circular lengthwise curvature and therefore of constantly changing radius. While this gear can be produced by the use of various tool means, it has been discovered that it can be cut most advantageously with a tapered hob such as illustrated diagrammatically at 13 and that it can be finished by the hob without resort to the usual generating roll. This gear, as above stated, can be meshed with either a taper worm corresponding to the hob or with a mating generated pinion. The worm may be produced in any suitable manner. The mating pinion may also be produced in any suitable process but preferably is manufactured by rotating a hob representing the basic gear in a continuous engagement with the pinion blank while imparting a relative rolling motion between said hob and blank in the manner of a gear meshing with its mating gear. One or both members of a pair of gears constructed according to this invention may, therefore, be produced in a hobbing operation with a consequent decrease in cost and with increased speed of production. The production of one member of a pair of gears having angularly disposed axes in a hobbing operation without roll, moreover, permits of employing simplified forms of machinery, eliminating the rolling motion, and further expedites the operation and reduces the costs.

Figure 4:
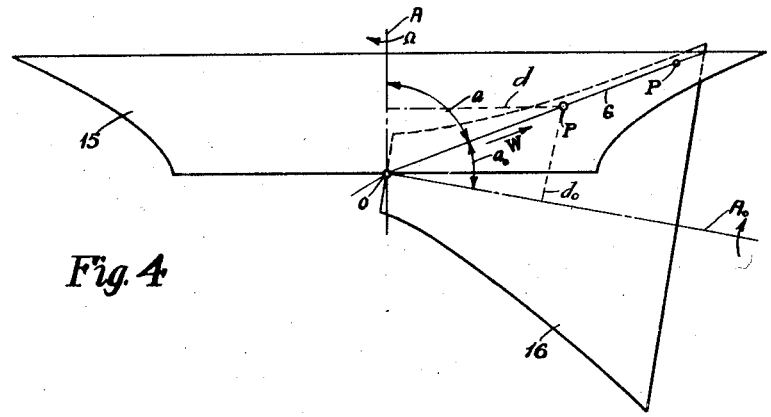
Fig. 4 is a diagrammatic plan view of a pair of hyperboloidal gears in intermeshing relation.
Figure 5:
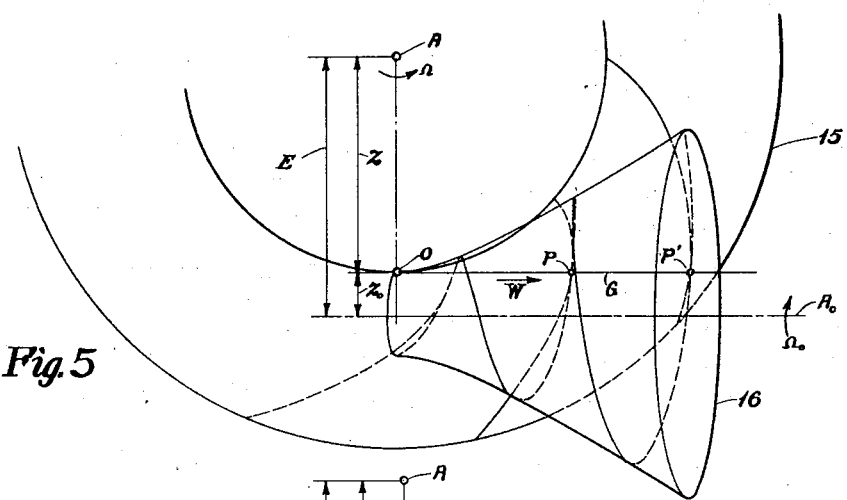
Fig. 5 is a side elevation of the same.

The principles, underlying the present invention and upon which the structure and arrangement of the mating gears are based, are best explained by a consideration of the theory of mesh of hyperboloid gears. Figs. 4 and 5 show a pair of such gears in intermeshing relation. The gear 15 rotates upon an axis A, while the gear 16 rotates on an axis $Ao$, which axes are parallel to the plane of the paper in Fig. 4, but are offset from one another at a distance E, as shown in Fig. 5.

Let N represent the number of teeth in the gear 15 and $No$ the number of teeth in the gear 16, so that the tooth ratio is $N/No$. The tooth shapes and characteristics of mesh depend solely upon the above ratio, but for convenience in the following explanation a velocity analysis will also be made.

If a point P, Figs. 4 and 5, be assumed to travel in space along any assumed line, while the two gears 15 and 16 rotate on their axes, point P will trace one path on the gear 15 and another path on the gear 16, which paths join at P. Such a point P can be a point of mesh or contact between the two gears when the tangents to the two paths coincide, that is, when these paths have a common tangent at P, the tooth inclination being assumed at will. The relative sliding velocity between the two gears is in the direction of the common tangent. The direction of a tangent to the paths is identical with the direction of the relative velocity and the existence of a common tangent at P, therefore, indicates relative velocities having the same directions.

Let it be further assumed that the absolute velocity of point P is in a plane parallel to the axes A and $Ao$. Let the following symbols represent the values indicated:

$W$ = the absolute velocity of P in a plane parallel to the axes A and $Ao$.

$a, ao$ = the angles between the direction of W and the axes A and $Ao$ respectively.

$Vs$ = the relative velocity component of P with respect to gear 15 in the direction of W.

$Vn$ = the relative velocity component of P with respect to gear 15 perpendicular to W in a plane parallel to axes A and $Ao$.

$Vz$ = the relative velocity component of P with respect to gear 15 in the direction Z, or perpendicular to a plane parallel to axes A and $Ao$.

$Vso, Vno, Vzo$ = the corresponding components of the relative velocity of P with respect to the gear 16.

$\Omega, \Omega_o$ = the angular velocities of gears 15 and 16 respectively.

$Z, Zo$ = the constant vertical distances of the plane of travel of P from the axes A and $Ao$, respectively.

$d, do$ = the distances of P from the axes A and $Ao$, respectively, in horizontal projection, Fig. 4.

With the directions of rotation of the gears and 15 and 16, indicated in Figs. 4 and 5, the following values of component velocities exist for the axes A and $Ao$:

For A:—
$Vs = W - Z \Omega \sin a$
$Vn = + Z \Omega \cos a$
$Vz = - d \Omega$

For $Ao$:—
$Vso = W - Zo \Omega \sin ao$
$Vno = - Zo \Omega_o \cos ao$
$Vzo = do \Omega_o$ Considering first the condition represented by the equation:

$$\frac{Vno}{Vzo} = \frac{Vn}{Vz}$$

and substituting in this equation the values above given, the following result is obtained:

$$\frac{do}{d} = \frac{Zo \cos ao}{Z \cos a}.$$

The last equation is a constant, $ao$ and $a$ being assumed constant. For other points in the same plane, as $P'$, Figs. 4 and 5, the ratio $\frac{do}{d}$ is always the same; hence all such points lie in a straight line G passing through the point O and only points lying in such straight line are capable of producing relative paths with a common tangent. Hence the line G is the line of action between the two gears 15 and 16 and the two pitch hyperboloids contact with one another along this straight line of action G and the threads or teeth of corresponding gears will mesh along this line. The location of this line can be found by letting S represent the distance of the point P from O, whence:

$$\frac{do}{d} = \frac{S \sin ao}{S \sin a} = \frac{Zo \cos ao}{Z \cos a}; \text{ and } \frac{\tan a}{\tan ao} = \frac{Z}{Zo}$$

Line G is the generatrix of the pitch surfaces of the gears 15 and 16, which are hyperboloids since this line is offset from the axis of each.

Considering now the equation:

$$\frac{Vso}{Vzo} = \frac{Vs}{Vz}$$

and the relations:

$$\frac{W}{\Omega_o} = \frac{LNo}{2\pi}; \text{ and } \frac{W}{\Omega} = \frac{LN}{2\pi}$$

where L=the lead per tooth and $No$, and $N$, the number of teeth, and substituting in the above equations their equivalent values given above and solving the equations for Z and Zo, the following equations will be obtained:

$$Zo = \frac{\tan ao}{\tan a + \tan ao} \times \frac{L}{2\pi} \left( \frac{No}{\sin ao} + \frac{N}{\sin a} \right)$$

$$Z = \frac{\tan a}{\tan a + \tan ao} \times \frac{L}{2\pi} \left( \frac{No}{\sin ao} + \frac{N}{\sin a} \right)$$

The distance between the axes A and Ao, that is, the amount of offset of the two axes is equal to E, which equals $Z + Zo$. The value of E is obtained therefore by adding the last two equations, whence:

$$E = \frac{L}{2\pi} \left[ \frac{No}{\sin ao} + \frac{N}{\sin a} \right]$$

It is to be noted that all of the other factors of the last equation being constants, the lead L also is a constant and consequently the gears 15 and 16 will be of constant pitch along the line G.

The gear 16 can also be considered as a hob. This hob will be of constant pitch along the line G and preferably of rack section along this line. It will therefore produce a gear having teeth of constant pitch substantially of rack section along the line G when it is rotated in engagement with the gear blank. The hob is formed by longitudinally gashing and relieving a tapered worm to produce cutting teeth of rack section and constant pitch in a plane offset from the axis of the hob, as more fully described hereinafter. This hob can mesh in the same way with different gears 15 so long as their angles $a$ and tooth numbers N fulfill the equation given above for Zo. The tooth number N can be expressed as a function of "$a$" as follows:

$$N = \left[ \tan a \left( \frac{2\pi Zo}{L} \times \frac{1}{\tan ao} \right) + \frac{2\pi Zo}{L} - \frac{No}{\sin ao} \right] \sin a$$

The gear produced may mesh with a worm corresponding in structure to the hob when arranged with its axis offset from the axis of the worm by the distance E. The gear, as has already been mentioned, may also form one of a pair of longitudinally curved tooth gears in which the other member will preferably be produced in a hobbing operation employing a generating roll and according to a method novel with this invention in which the hob and pinion blank are rolled together in the manner of a gear meshing with its mating gear.

Figure 6:
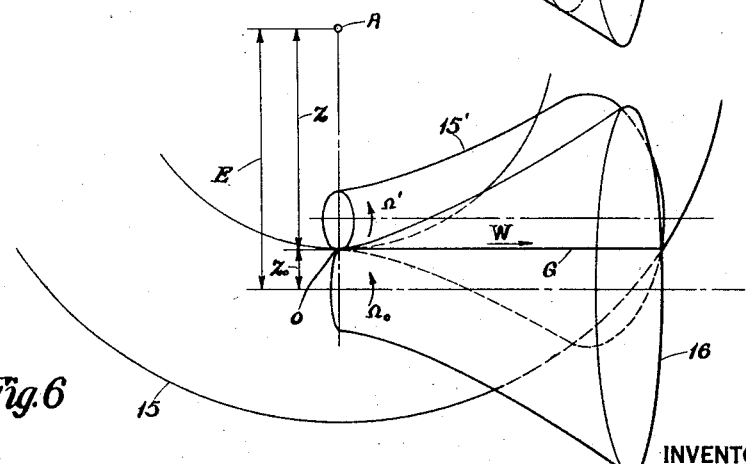
Fig. 6 is a diagrammatic plan view further illustrative of the principles underlying the present invention and showing the relation between the hobs employed in cutting a pair of gears according to this invention.

The principles upon which the production of this conjugate bevel pinion is based are illustrated diagrammatically in Figure 6. It has been found that a second hob 15' can be made to mesh with the hob 16 in the same manner that the latter meshes with the basic gear 15, that is to say, a second or counter hob 15' can be constructed which will mesh internally with and sweep out the teeth of the basic gear 15 so as to represent the latter when swung about the axis A of such gear. The hob and counter hob may mesh with one another along the same line G. Along this line the counter hob will therefore have the same pitch and rack section as the gear 15 itself and it is, therefore, capable of representing the gear 15 in cutting a mating gear when given a suitable generating or feeding motion about the axis of said gear 15. The counter hob must of course fulfill the above equation for N. It is, therefore, possible with this invention to produce a pair of bevel gears by hobbing one member, preferably the larger member of the pair, without a generating roll and by cutting the mating gear with a counter hob while providing a relative generating movement between the counter hob and the gear blank about the apex of the blank as if the blank were rolling on its mating gear.

Figure 7:
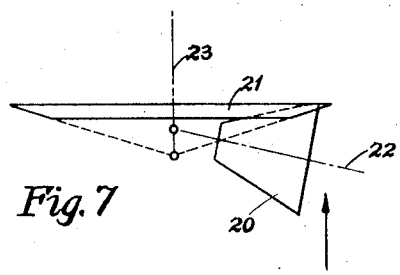
Figs. 7 and 8 are a diagrammatic plan view and side elevation respectively illustrating the method of cutting, according to this invention, the gear or larger member of a pair which may mesh selectively with a worm or with a mating pinion produced with an additional generating roll.
Figure 9:
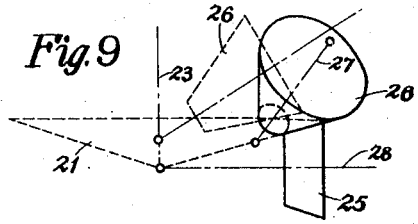
Figs. 9 and 10 are similar views illustrating diagrammatically the method of producing a bevel pinion with this invention.
Figure 8:
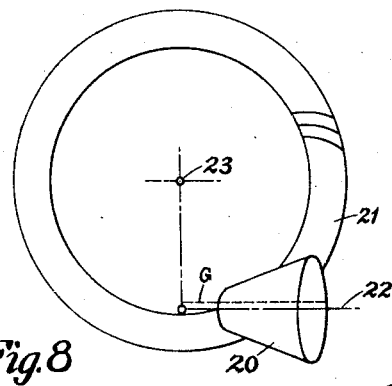
Figure 10:
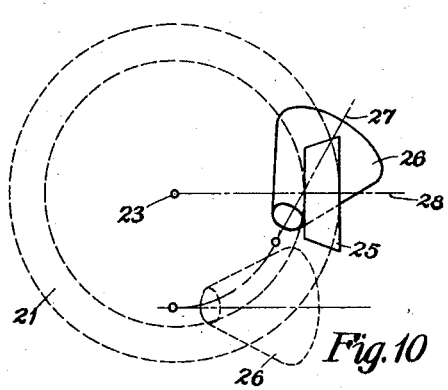

The method of producing a bevel pair according to this invention is illustrated diagrammatically in Figures 7 to 10 inclusive, Figures 7 and 8 illustrating the manner of producing one member, preferably the larger member, without generating roll and Figures 9 and 10 showing the manner of producing a conjugate gear in a generating operation. In Figure 7 a taper hob 20 is shown diagrammatically, arranged in cutting contact with a bevel gear blank 21, with the axis 22 of the hob offset from the axis 23 of the gear blank by the distance E determined as above described. For producing the gear, the hob 20 and the blank 21 are rotated about their respective axes in timed intermeshing relation to effect a continuous cutting and indexing action between hob and blank and simultaneously a relative feeding movement is imparted between the hob and blank, preferably parallel with the blank axis 23 to obtain the desired tooth height on the blank, so that in effect, the hob is sunk into the blank to the full depth of the tooth being cut. It is to be noted that the manipulation of the hob and blank comprises exclusively the cutting and indexing rotation and the simple feeding movement described so that the blank can be cut without resorting to a generating roll and consequently the gear can be very rapidly manufactured. In cutting the mating gear 25, a counter hob 26 will be employed, preferably, and this counter hob will be positioned relative to the gear blank 25 so as to represent the gear 21. The counter hob and blank are rotated about their respective axes 27 and 28 to produce a continuous cutting and indexing action and simultaneously a relative generating roll is imparted between the counter hob and blank as though about the axis 23 of the mate gear 21. The generating roll about the axis 23 is added to or subtracted from the indexing rotation of the hob or blank about this same axis. In a machine for producing the gear 25, this would be accomplished through the use of a differential or a similar mechanism.

It will thus be seen that the gear 21 may be cut in a simple and rapid manner by merely sinking the hob into the blank without a generating roll, while the mating gear or pinion 25 is cut with a similar hob in a rapid and practical manner involving a relative generating roll for which the mating gear 21 is the basis.

As already stated, the rotation of the line of action G about the axis of the gear generates a hyperboloidal surface. This is shown at 30, Figure 11, in connection with a hob 13 constructed according to this invention and at 32 Figure 2, in connection with the gear 14 which may be produced by the hob 13. The angle $a$ and the offset Z are so chosen that the said hyperboloidal surface approximates either the pitch cone of the gear or the conical surface which lies midway between the root and face cones of the gear. The profile 32 of such a hyperboloidal surface is shown in Figure 2 as tangent to the profile 34 of the latter of such conical surfaces.

The tapers of hob and counter hob can be made alike when the hob construction corresponds to the above equation for the value of $Z_o$ which reduces, $N_o$ being equal to unity, to the form:

$$\sin a_o = \frac{L}{2\pi Z_o}.$$

In this case, the formula for N given above reduces to:

$$N = \frac{\cos a_o}{\sin^2 a_o} \times \frac{\sin^2 a}{\cos a}.$$

In practice, the hob and counter hob are preferably alike in construction and in fact one and the same hob may be employed as both hob and counter hob. This hob will cut the gear without generating roll and the mating pinion with a generating roll corresponding to the mesh between gear and pinion, as already described with reference to Figures 9 and 10.

Figure 11:
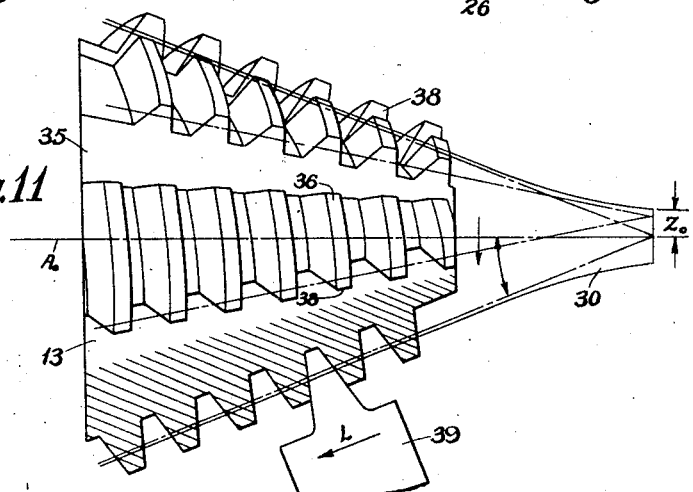
Fig. 11 is a side elevation of a taper hob such as might be employed in producing gears according to this invention.
Figure 12:
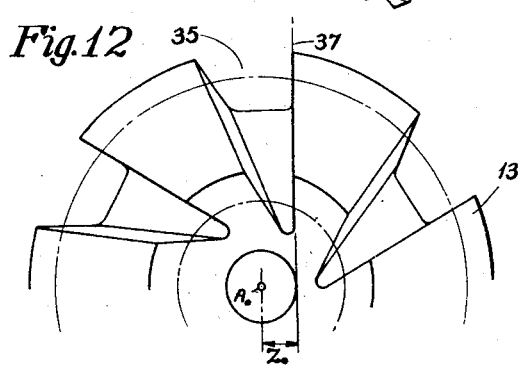
Fig. 12 is a fragmentary end view of the same.

The construction of the hob is shown in Figures 11 and 12. The hob has generally the form of a taper worm gashed longitudinally or fluted as at 35 and relieved as shown to produce cutting blades 36 of rack section and constant pitch in a plane 37, Figure 12, offset from the axis $A_o$ of the hob a distance $Z_o$, as heretofore described. The cutting faces 38 of the cutting teeth 36 of the hob are preferably though not necessarily located in said plane 37. For producing the hob, the relieving tool 39 is led at a uniform lead along the line of action and is preferably positioned above center corresponding to the desired offset of the hob. With the use of rake flutes 35 such as shown, improved cutting qualities are combined in this type of tapered hob with mathematical correctness. The hob can cut gears of various tooth numbers N and taper angles $a$ having the relations expressed in the simplified equation for N already given. The taper angle $a$, not the cone angle, may be accurately determined by solving for $a$ in the last equation for N above. The angle $a$ is required for hob settings. In cutting the gear, the hob offset is $Z + Z_o$ which can be obtained from the above equations. The inclination of the hob axis is $a_o - (90° - a)$. In cutting the pinion, the hob distance is $Z - Z_o$ and the inclination of the hob axis is $a_o + (90° - a)$. A hob can cut practically all bevel gears corresponding to bevel pinions of a given tooth number irrespective of their cone angles and a wide range of bevel gears can therefore be cut with comparatively few hobs.

When the same hob is used for cutting both members of a pair of bevel gears, as is preferable, the data for the member which is produced without roll can be obtained as follows:

$$Z = \frac{L}{2\pi \sin a} \times N$$

which formula may be readily derived from the above equations.

Figure 13:
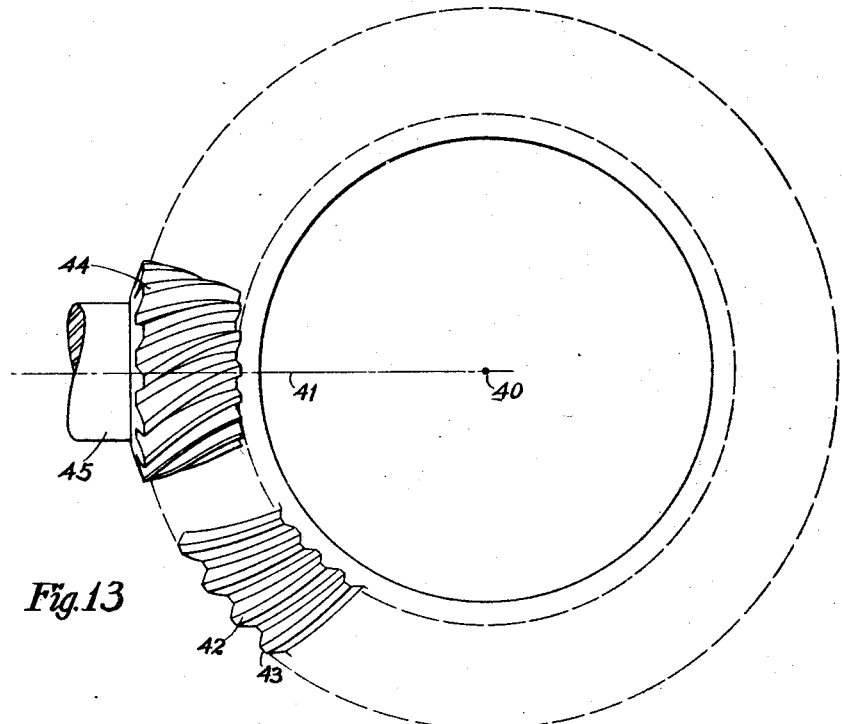
Fig. 13 is a side elevation of a pair of bevel gears produced according to this invention.

A pair of bevel gears constructed according to this invention are shown in Figure 13. The axes 40 and 41 of these gears intersect each other and are preferably arranged at right angles. The teeth 42 of the gear 43 are longitudinally curved and of rack section along a straight line offset from the axis 40 of this gear as already described. The teeth 44 of the pinion 45 are longitudinally curved and are conjugate to those of the gear. The teeth of the pinion are preferably produced in the hobbing generating process described with reference to Figures 9 and 10.

Figure 14:
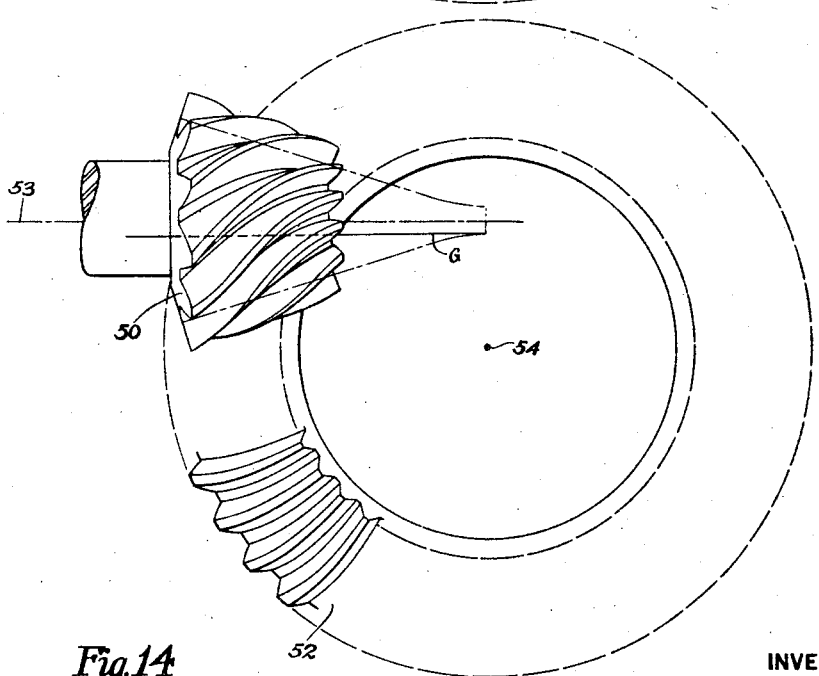
Fig. 14 is a side elevation showing a taper worm in mesh with a gear such as shown in Fig. 1.

In Figure 14, I have shown a pair of tapered gears constructed according to this invention and arranged with axes non-intersecting and non-parallel, comprising a taper worm 50, and a mating tapered gear 52 such as might be produced by rotating the worm in continuous cutting and indexing engagement with the gear, according to the method described with reference to Figures 7 and 8. Each of these gears will be of constant pitch along the straight line G offset from their respective axes 53 and 54. The worm 50 will be of the same construction as the hob employed to produce the gear 52. Preferably the worm 50 will be multiple threaded as shown, to obtain a suitable ratio N/No. The corresponding hob used to produce the gear 52 will therefore be multiple threaded also and of same number of threads as the worm. In Figures 7 and 8 and in other figures of the drawings, the hob axis is shown inclined at an angle other than a right angle to the axis of the gear blank as this illustrates a general solution of the problem of correctly producing a tapered gear by a hobbing process without roll. In practice, however, it is most usual to mount a pair of tapered gears so that their axes are at right angles and this mounting is illustrated in Figure 14, the axis 53 of the worm being at right angles and offset from the axis 54 of the gear 52. It will be understood that in this case the axis of the taper hob used to produce the gear 52, and which corresponds in structure to the worm, will be positioned at right angles to the axis of the gear blank during the hobbing operation for producing the gear 52.

While I have described my invention in connection with certain specific embodiments, it will be understood that the invention is capable of further modification within its scope or the limits of the appended claims and that this application is intended to cover any adaptations or embodiments following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention what I claim is:

1. A tapered gear having longitudinally curved teeth and of constant pitch along a straight line offset from its axis.

2. A tapered gear having longitudinally curved teeth of straight profile and of rack section along a straight line offset from its axis.

3. A pair of longitudinally curved tooth bevel gears, one of which is of constant pitch along a straight line offset from its axis and the other of which is provided with teeth conjugate to those of the first gear and molded generated.

4. A pair of gears provided with longitudinally curved teeth and adapted to mesh with axes non-intersecting and non-parallel, each of which is of constant pitch along a straight line offset from its axis.

5. A pair of tapered gears provided with longitudinally curved teeth and adapted to mesh with axes non-intersecting and non-parallel, said gears contacting along a straight line offset from the axes of both gears.

6. A pair of tapered gears adapted to mesh with axes non-intersecting and non-parallel, one of which is provided with longitudinally curved teeth, said gear being of constant pitch along a straight line offset from its axis.

7. A pair of gears meshing with axes non-intersecting and non-parallel, one of which is a worm of constant pitch along a straight line offset from its axis and the other of which is a gear such as might be produced by said worm when the axis of the worm is angularly disposed with reference to and offset from the axis of a gear blank while the two elements are rotated in timed relation.

8. A gear having longitudinally curved teeth such as might be produced in a blank by a worm of constant pitch along a straight line offset from its axis when the axis of the worm is angularly disposed with reference to and offset from the axis of the blank while the two elements are rotated in timed relation.

9. A tapered gear having longitudinally curved teeth such as might be produced in a gear blank by a taper worm of constant pitch along a straight line offset from its axis when the axis of the worm is angularly disposed with reference to and offset from the axis of the blank while the two elements are rotated in timed relation.

10. A pair of gears one of which is such as might be produced by a worm hob when the axes of the hob and blank are arranged to be non-intersecting and non-parallel and are maintained in fixed relation while said hob and blank are rotated about their respective axes in timed relation, and the other of which is such as might be produced by a worm hob when the axes of said hob and a gear blank are arranged to be non-intersecting and non-parallel and the hob and blank are rotated about their respective axes in timed relation while a relative rolling movement is imparted between hob and blank.

11. A pair of tapered gears one of which is such as might be produced by a tapered hob when the axes of the hob and of a gear blank are arranged to be non-intersecting and non-parallel and are maintained in fixed relation while said hob and blank are rotated about their respective axes in timed relation, and the other of which is such as might be produced by a taper hob when the axes of said hob and a gear blank are arranged to be non-intersecting and non-parallel and the hob and blank are rotated about their respective axes in timed relation while a relative rolling movement is imparted between the hob and blank in the manner of a gear rolling on a conical surface.

12. A pair of tapered gears one of which is such as might be produced by a tapered hob of constant pitch when the axes of the hob and of a gear blank are arranged to be non-intersecting and non-parallel and are maintained in fixed relation while said hob and blank are rotated about their respective axes in timed relation, and the other of which is such as might be produced by a taper hob of constant pitch when the axes of said hob and a gear blank are arranged to be non-intersecting and non-parallel and the hob and blank are rotated about their respective axes in timed relation while a relative rolling movement is imparted between the hob and blank in the manner of a gear rolling on a conical surface.

13. A pair of tapered gears one of which is such as might be produced by a taper hob, of constant pitch along a straight line offset from its axis, when the axes of the hob and of a gear blank are arranged to be non-intersecting and non-parallel and are maintained in fixed relation while said hob and blank are rotated about their respective axes in timed relation, and the other of which is such as might be produced by a taper hob, of constant pitch along a straight line offset from its axis, when the axes of said hob and a gear blank are arranged to be non-intersecting and non-parallel and the hob and blank are rotated about their respective axes in timed relation while a relative rolling movement is imparted between the hob and blank in the manner of a gear rolling on a conical surface.

14. A tapered gear having teeth of constant pitch along a straight line offset from its axis, the linear pitch L, the amount of offset Z, and the inclination $a$ to the gear axis, of said straight line bearing substantially the following relation with one another:

$$\sin a = \frac{LN}{2\pi Z}.$$

15. A pair of longitudinally curved tooth bevel gears, one of which has teeth of straight profile and is of rack section along a straight line offset from its axis, and the other of which is provided with teeth conjugate to those of the first gear and molded-generated.

ERNEST WILDHABER.